(12) United States Patent
Zhao et al.

(10) Patent No.: US 9,509,096 B2
(45) Date of Patent: Nov. 29, 2016

(54) MANUAL SERVICE DISCONNECTS FOR BATTERY SYSTEMS

(71) Applicant: Tyco Electronics Corporation, Berwyn, PA (US)

(72) Inventors: Weiping Zhao, Superior Township, MI (US); James Aric Boyer, Troy, MI (US)

(73) Assignee: TYCO ELECTRONICS CORPORATION, Berwyn, PA (US)

( * ) Notice: Subject to any disclaimer, the term of this patent is extended or adjusted under 35 U.S.C. 154(b) by 237 days.

(21) Appl. No.: 13/738,741

(22) Filed: Jan. 10, 2013

(65) Prior Publication Data

US 2014/0193990 A1    Jul. 10, 2014

(51) Int. Cl.

| | |
|---|---|
| *H01R 13/688* | (2011.01) |
| *H01R 13/629* | (2006.01) |
| *H01R 13/633* | (2006.01) |
| *H01R 13/648* | (2006.01) |
| *H01R 13/703* | (2006.01) |

(Continued)

(52) U.S. Cl.
CPC ........ *H01R 13/6335* (2013.01); *H01R 13/648* (2013.01); *H01R 13/688* (2013.01); *H01R 13/703* (2013.01); *H01R 13/713* (2013.01); *H01M 10/4207* (2013.01); *H01M 2200/103* (2013.01); *H01R 13/62938* (2013.01); *H01R 13/66* (2013.01); *H01R 13/684* (2013.01); *H01R 2201/26* (2013.01)

(58) Field of Classification Search
CPC .......... H01R 13/6335; H01R 13/7031; H01R 13/707; H01R 9/265; H01R 9/245; H01R 13/68; H01R 13/684; H01H 85/54; H01H 85/50

USPC ........ 439/500, 97, 100, 620.26–620.29, 160, 439/435

See application file for complete search history.

(56) References Cited

U.S. PATENT DOCUMENTS 6,049,140 A * 4/2000 Alksnat et al. ............... 307/10.2
6,773,307 B2 * 8/2004 Beer ........................ 439/620.26

(Continued)

FOREIGN PATENT DOCUMENTS

WO    2012 / 078721 A2    6/2012

OTHER PUBLICATIONS

Drawing No. C-2103326C, Plug Assembly AMP+ Service Disconnect, AMP+ SD 125, Rev. 5, Jan. 23, 2013, 2pgs, TE Connectivity.

(Continued)

*Primary Examiner* — Felix O Figueroa
*Assistant Examiner* — Paul Baillargeon

(57) ABSTRACT

A manual service disconnect for a battery system includes a disconnect header having a housing defining a receptacle, a high current terminal connector within the receptacle, a high voltage interlock (HVIL) connector within the receptacle and a control device terminal connector within the receptacle. A disconnect plug is removably coupled to the disconnect header. The disconnect plug has a high current fuse electrically connected to the high current terminal connector and a HVIL shunt terminal electrically connected to the HVIL connector. A current power control device is received in the receptacle and is electrically connected to the control device terminal connector. The current power control device is exposed for servicing when the disconnect plug is removed from the disconnect header and the current power control device is inaccessible when the disconnect plug is coupled to the disconnect header.

20 Claims, 9 Drawing Sheets

(51) Int. Cl.
  *H01R 13/713* (2006.01)
  *H01R 13/684* (2011.01)
  *H01R 13/66* (2006.01)
  *H01M 10/42* (2006.01)

(56) References Cited

U.S. PATENT DOCUMENTS

| | | |
|---|---|---|
| 7,084,361 B1 * | 8/2006 | Bowes et al. ............... 200/16 R |
| 7,704,099 B1 | 4/2010 | Hong et al. |
| 7,789,690 B1 * | 9/2010 | Rhein ........................ 439/310 |
| 2003/0003807 A1 | 1/2003 | Beer |
| 2010/0271168 A1 | 10/2010 | Niedzwiecki et al. |
| 2013/0099765 A1 * | 4/2013 | Girard et al. ................. 323/282 |

OTHER PUBLICATIONS

Intuitive. Single Throw. Two Stage Latch. AMP+ Service Disconnect SD 125, 2 pgs, 2012, Tyco Electronics Corporation, a TE Connectivity Ltd. Company.

International Search Report, International Application No. PCT/US2013/078188, International Filing Date, Dec. 30, 2013.

* cited by examiner

MANUAL SERVICE DISCONNECTS FOR BATTERY SYSTEMS

BACKGROUND OF THE INVENTION

The subject matter herein relates generally to manual service disconnects for battery systems.

Batteries, such as those for electric vehicles or hybrid vehicles, typically include a plurality of cells grouped together as a battery pack. The battery pack includes battery distribution units that manage the power capacity and functionality of the battery pack. The battery distribution units are typically mounted within the outer casing housing the battery pack. The battery pack also includes manual service disconnects that allow disconnecting of the high current power circuit of the battery pack, such as for service of the battery pack. The manual disconnects include a high current fuse creating a fused electrical path for the battery pack coupling with a high voltage interlock (HVIL) that controls operation of the high current electrical circuit. The high current fuse may have an amp range of between 50 A-200 A.

The battery pack typically includes low current fuses that create fused electrical paths for components of the accessories, such as an air conditioner, and/or the DC/DC converter. The low current fuses may have an amp range up to 50 A. The low current fuses are typically located inside the battery distribution unit inside the battery pack casing. The low current fuses are not easily serviced. Servicing of the low current fuses requires opening of the battery pack casing, and then either remove the whole battery distribution unit or open the battery distribution unit to replace the low current fuses. Service of such fuses is time consuming and difficult.

Furthermore, moving the low current fused to the exterior of battery pack requires cutting an additional opening on the outer casing. The outer casing of the battery pack is used to provide electrical shielding for components of the battery pack. Any openings through the outer casing to service the fuses create areas for EMI leakage, diminishing the effectiveness of the electrical shielding and increasing the cost.

A need remains for a battery system that provides servicing and replacement of fuses without cutting additional openings in the battery pack casing.

BRIEF DESCRIPTION OF THE INVENTION

In one embodiment, a manual service disconnect for a battery system is provided including a disconnect header configured to be mounted externally proximate to a battery pack. The disconnect header includes a housing defining a receptacle, a high current terminal connector within the receptacle, a high voltage interlock (HVIL) connector within the receptacle and a control device terminal connector within the receptacle. A disconnect plug is removably coupled to the disconnect header. The disconnect plug has a high current fuse electrically connected to the high current terminal connector and a HVIL shunt terminal electrically connected to the HVIL connector. A current power control device is received in the receptacle. The current power control device is electrically connected to the control device terminal connector. The current power control device is exposed for servicing when the disconnect plug is removed from the disconnect header and the current power control device is inaccessible when the disconnect plug is coupled to the disconnect header.

Optionally, a space may be defined in the receptacle between the HVIL connector and the high current terminal connector and the current power control device is positioned in the space. The housing may include an open top and the disconnect plug may be plugged into the housing to close the open top. The current power control device may be covered by the disconnect plug.

Optionally, the disconnect header may include a base configured to be mounted directly to the battery pack. The high current terminal connector, the high voltage interlock connector and the control device terminal connector may extend into the battery pack through the base. The base may have a top and a bottom with the housing extending from the top. The bottom may be configured to be mounted directly to the battery pack.

Optionally, the current power control device may be configured to be disconnected from the control device terminal connector and removed from the disconnect header when the disconnect plug is removed from the disconnect header.

Optionally, the high current terminal connector may include a pair of high current terminals. The high current fuse may include a pair of contacts electrically connected to the high current terminals when the disconnect plug is coupled to the disconnect header. The high current fuse may define a fused electrical path between the contacts.

Optionally, the HVIL connector may include a pair of HVIL terminals. The HVIL shunt terminal may create a shunt electrical path between the HVIL terminals when the disconnect plug is coupled to the disconnect header.

Optionally, the control device terminal connector may include a pair of low current terminals. The current power control device may include a serviceable fuse. The serviceable fuse may electrically connect the low current terminals when the disconnect plug is coupled to the disconnect header. The serviceable fuse may define a fused electrical path between the low current terminals. The manual service disconnect may include a second control device terminal connector and a second current power control device in the disconnect header. Optionally, the HVIL connector may be positioned between the current power control device and the second current power control device. The disconnect plug may include an HVIL shroud surrounding the HVIL shunt terminal. The HVIL shroud may be positioned between the current power control device and the second current power control device when the disconnect plug is coupled to the disconnect header.

Optionally, the manual service disconnect may include a relay received in the receptacle. The relay may be exposed when the disconnect plug is removed from the disconnect header. The relay may be inaccessible when the disconnect plug is coupled to the disconnect header.

DETAILED DESCRIPTION OF THE INVENTION

Figure 1:
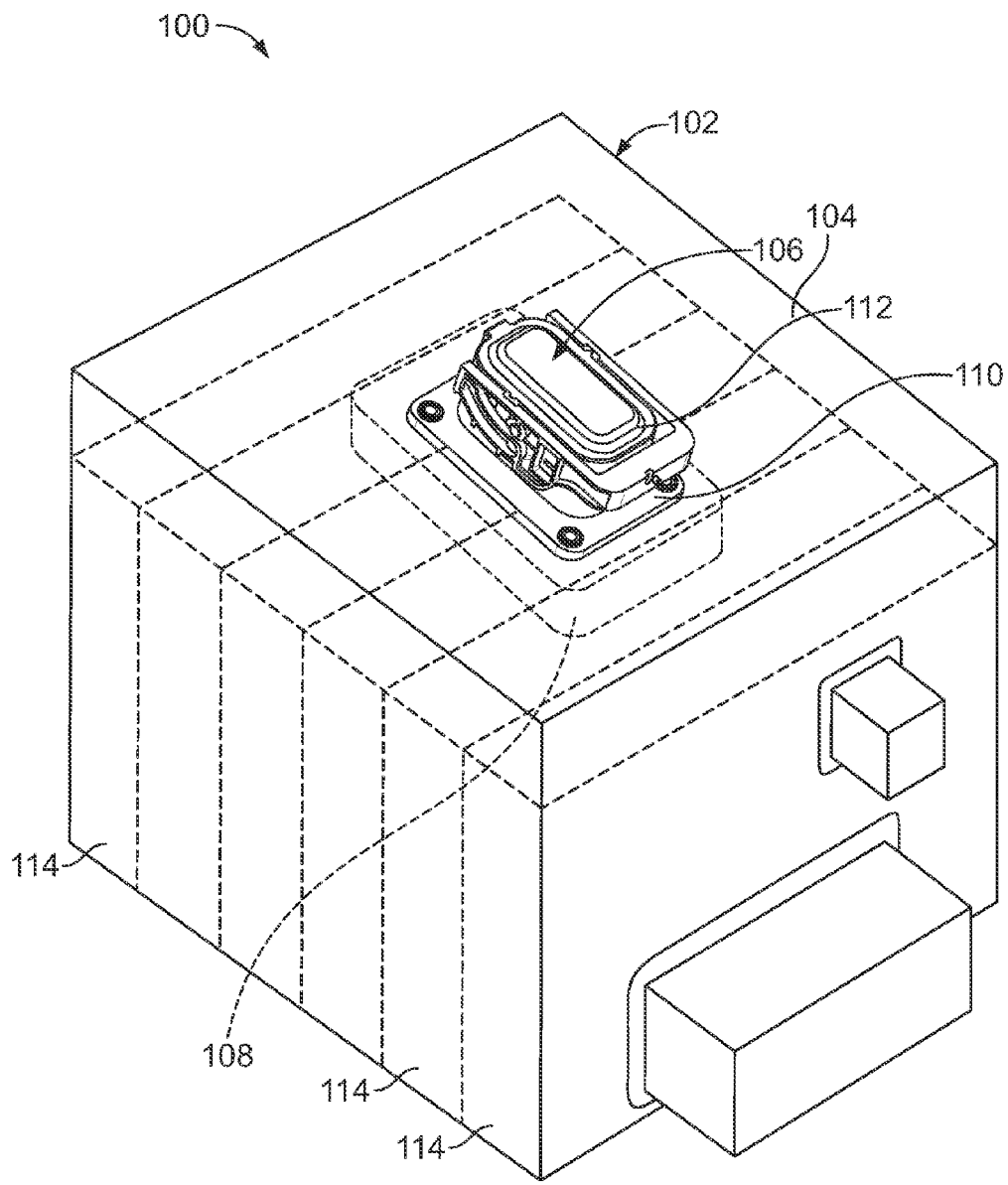
FIG. 1 illustrates a battery system formed in accordance with an exemplary embodiment.

FIG. 1 illustrates a battery system 100 formed in accordance with an exemplary embodiment. The battery system 100 includes one battery pack 102 contained within a chassis or an outer casing 104 and a manual service disconnect (MSD) 106 mounted proximate to the battery pack 102. For example, the MSD 106 may be mounted directly to the outer casing 104. The MSD 106 may be mounted to another structure near the battery pack 102.

The battery pack 102 may be part of a high voltage energy storage system. For example, the battery pack 102 may be used in an automotive application, such as part of an electric vehicle or a hybrid electric vehicle In an exemplary embodiment, the battery system 100 uses a battery distribution unit 108 to manage the power capacity and functionality of the battery system 100, such as by measuring current and regulating power distribution of the battery pack 102. The battery system 100 may have both a high current power circuit and a low current power circuit, both electrically connected to the battery pack 102 and/or the battery distribution unit 108. Low current and high current or low voltage and high voltage may be relative to each other and do not require any particular range or threshold. Optionally, the MSD 106 may operate to disconnect the high current power circuit while the low current power circuit may remain connected when the MSD 106 is disconnected.

The MSD 106 is electrically connected to the battery distribution unit 108. The battery distribution unit 108 may be internal to the outer casing 104 or may be mounted to an exterior of the outer casing 104. The battery distribution unit 108 is electrically connected to the battery pack 102. In an exemplary embodiment, the battery distribution unit 108 is provided at the battery pack 102. Alternatively, the battery distribution unit 108 may be located remote from the battery pack 102 and may be part of a centralized system that manages the individual battery pack 102 from such central location.

The battery distribution unit 108 may monitor and/or control the operation of the components of the battery system 100. The battery distribution unit 108 may measure or react to the battery health of the battery pack 102. The battery distribution unit 108 may measure or react to the battery status of the battery pack 102. The battery distribution unit 108 may monitor for or react to overvoltage and/or low voltage situations with the battery pack 102. The battery distribution unit 108 may react due to the temperature changing of the battery pack 102. The battery distribution unit 108 may manage charging functions of the battery pack 102.

The MSD 106 includes a disconnect header 110 and a disconnect plug 112 removably coupled to the disconnect header 110. The MSD 106 is used to disconnect or open the power circuit of the battery system 100, such as during service or maintenance. For example, the disconnect plug 112 may be disconnected and removed from the disconnect header 110. In an exemplary embodiment, the MSD 106 includes fuses to provide over current protection for the power circuits) and a high voltage interlock (HVIL) circuit to control the high current power circuit during opening and closing of the MSD 106, such as during unplugging and plugging of the disconnect plug 112 from the disconnect header 110. The MSD 106 allows for easy access to the fuses for servicing and/or replacing the fuses. For example, when the disconnect plug 112 is unplugged, the fuses may be accessed. Accessing the fuses through the MSD 106 allows servicing without needing to enter the battery pack 102. For example, the technician does not need to open the outer casing 104 to service the fuses. Additional openings in the outer casing 104 do not need to be provided to access the fuses, which allows better sealing and shielding of the battery module 102. The MSD 106 may hold relays or other types of current power control devices in addition to or in the alternative to the fuses, which may be serviced when the MSD 106 is disconnected and opened.

In an exemplary embodiment, the MSD 106 utilizes a two stage lever to open the HVIL circuit prior to separation of the high current power circuit. Optionally, the MSD 106 provides a tool-free solution for disconnecting the disconnect plug 112, such as a hand operated lever. In an exemplary embodiment, all high current conducting surfaces on the MSD 106 are finger proof and touch safe.

In an exemplary embodiment, the battery pack 102 includes a plurality of battery cells 114 housed within the outer casing 104. The battery cells 114 may be any type of battery cells. For example, the battery cells 114 may be pouch battery cells or prismatic battery cells. Other types of battery cells may be used in alternative embodiments. Optionally, the battery cells 114 may be narrow plates arranged in a stacked configuration. Any number of battery cells 114 may be provided in the battery pack 102. Each of the battery cells 114 may be electrically connected to the battery distribution unit 108.

Figure 2:
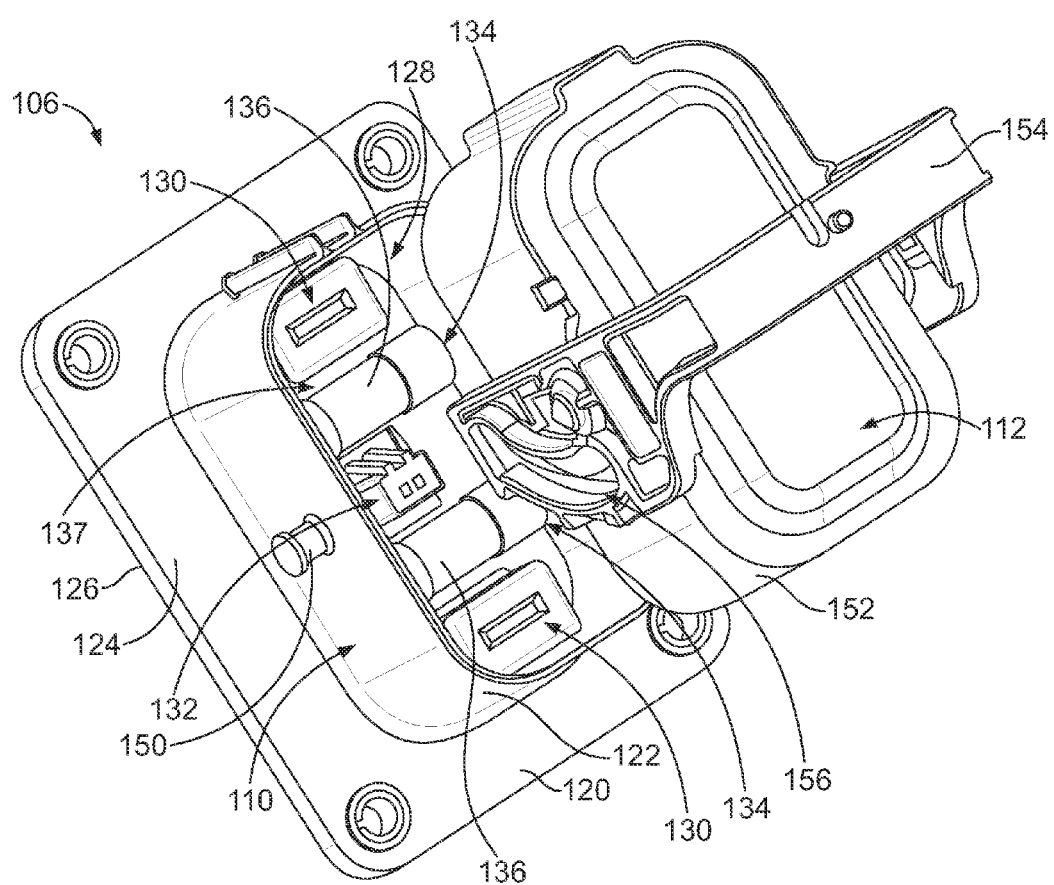
FIG. 2 is a top perspective view of a manual service disconnect (MSD) showing a disconnect plug unmated from a disconnect header.

FIG. 2 is a top perspective view of the MSD 106 showing the disconnect plug 112 unmated from the disconnect header 110. The disconnect header 110 includes a base 120 and a housing 122 extending from a top 124 of the base 120. The base 120 includes a bottom 126 opposite the top 124. The housing 122 defines a receptacle 128 generally above the base 120. The disconnect plug 112 is configured to be coupled to the housing 122, with a portion of the disconnect plug 112 being received in the receptacle 128 when mated thereto.

The disconnect header 110 includes a high current terminal connector 130 within the receptacle 128. The disconnect header 110 includes a HVIL connector 132 within the receptacle 128. The disconnect header 110 includes one or more control device terminal connectors 134 within the receptacle 128. The control device terminal connectors 134 have current power control device 136 electrically connected thereto. In the illustrated embodiment, the control device terminal connectors 134 are low current terminal connectors 134 and the current power control device constitute serviceable fuses 136 that create fused electrical paths for the low current terminal connectors 134. The description hereinafter may be described with reference to control device terminal connectors 134 being low current terminal connectors 134; however it is realized that other types of control device terminal connectors may be used in addition to, or in the alternative to, the low current type, such as high current types. The description hereinafter may be described with reference to current power control devices being serviceable fuses; however it is realized that other types of current power control devices may be used in addition to, or in the alternative to, the serviceable fuses, such as relays, contactors, and the like.

In an exemplary embodiment, the housing 122 includes a space 137 defined between the HVIL connector 132 and the high current terminal connector 130 or between the connectors 130, 132 and the walls of the housing 122. The serviceable fuses 136 are positioned in the space 137. The serviceable fuses 136 are exposed for servicing and replacing when the disconnect plug 112 is unmated from the disconnect header 110. When the disconnect plug 112 is mated to the disconnect header 110, the serviceable fuses 136 are covered and are inaccessible.

The disconnect plug 112 carries an HVIL shunt terminal 138 (shown in FIG. 3) configured to be electrically connected to the HVIL connector 132 when the disconnect plug 112 is mated with the disconnect header 110. The HVIL connector 132 and the HVIL shunt terminal 138 create a shunted electrical path when the disconnect plug 112 is coupled to the disconnect header 110. The disconnect plug 112 carries a high current fuse 140 (shown in FIG. 3) configured to be electrically connected to the high current terminal connector 130 when the disconnect plug 112 is mated with the disconnect header 110. The high current terminal connector 130 and high current fuse 140 create a fused electrical path when the disconnect plug 112 is coupled to the disconnect header 110.

In the illustrated embodiment, the housing 122 is generally rectangular in shape having side walls with rounded corners therebetween. The housing 122 may have other shapes in alternative embodiments. The disconnect plug 112 has a complementary shape to the housing 122 for mating with the disconnect header 110. The disconnect plug 112 is plugged into the housing 122 to close the open top thereof. In the illustrated embodiment, posts 150 extend outward from the housing 122.

The disconnect plug 112 includes a cover 152 that extends around the housing 122 when the disconnect plug 112 is coupled to the disconnect header 110. Portions of the disconnect plug 112 are received in the receptacle 128 when the disconnect plug 112 is mated with the disconnect header 110. The disconnect plug 112 includes a lever 154 rotatably coupled to the cover 152. The lever 154 includes latches 156 that engage the posts 150 to secure the disconnect plug 112 to the disconnect header 110. Optionally, as the lever 154 is rotated closed, the disconnect plug 112 is pulled into the disconnect header 110. The lever 154 locks the disconnect plug 112 to the disconnect header 110. Optionally, as the lever 154 is rotated open, the disconnect plug 112 is pushed away from the disconnect header 110, which may automatically unmate one or more connectors, such as the HVIL connector 132 and the high current terminal connector 130.

Figure 3:
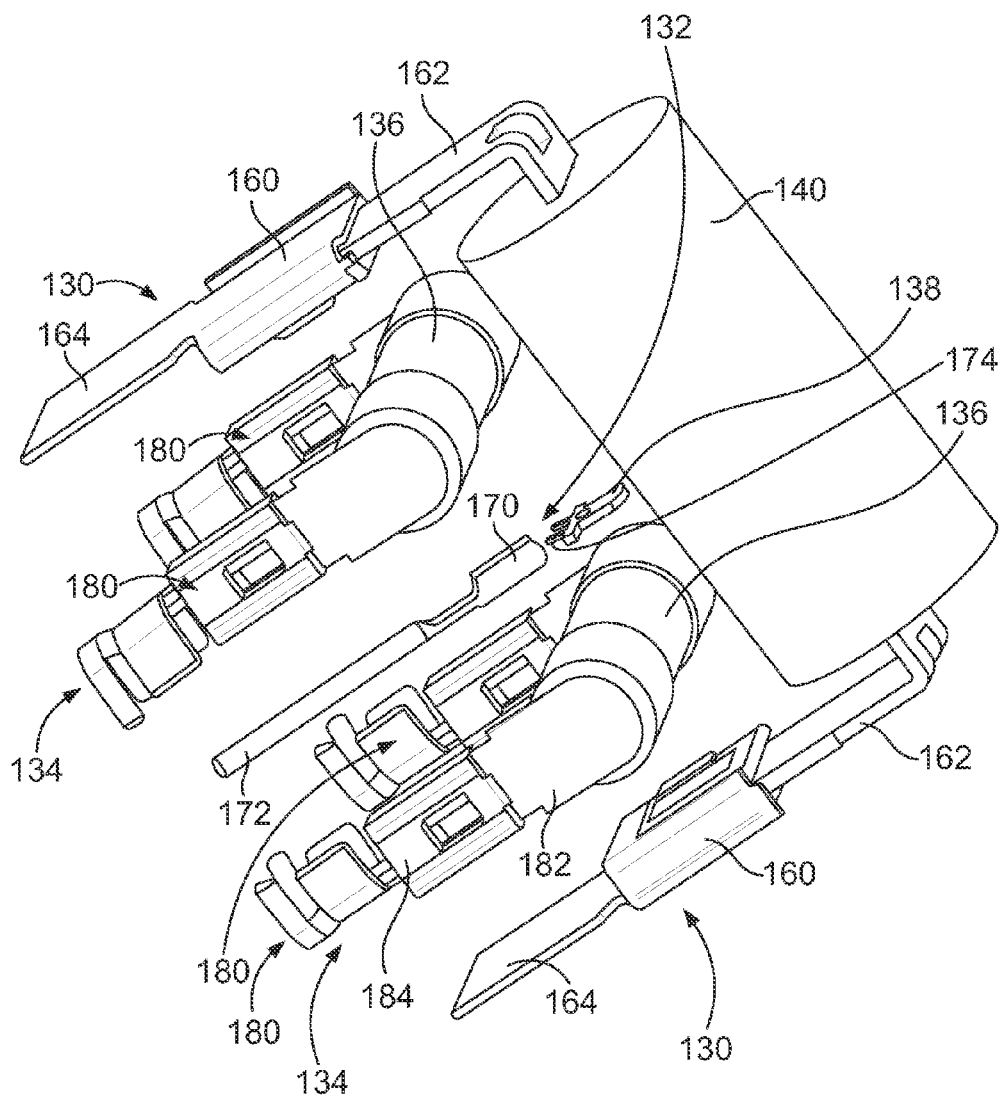
FIG. 3 illustrates the electrical components of the MSD with the housings removed for clarity.

FIG. 3 illustrates the electrical components of the MSD 106 with the housings removed for clarity. FIG. 3 illustrates the serviceable fuses 136, the HVIL shunt terminal 138 and the high current fuse 140. FIG. 3 also illustrates portions of the low current terminal connector 134, the HVIL connector 132 and the high current terminal connector 130.

The high current terminal connector 130 includes a pair of high current terminals 160 that are configured to be electrically connected to the high current fuse 140 when the disconnect plug 112 is coupled to the disconnect header 110. In the illustrated embodiment, the high current terminals 160 are socket terminals having a box shaped mating portion that receives corresponding contacts 162 of the high current fuse 140. In the illustrated embodiment, the contacts 162 are blade type contacts. In alternative embodiments, the high current terminals 160 and the contacts 162 may include structures other than socket and blade type structures. The high current terminals 160 have terminating ends 164 that are configured to be terminated to other electrical conductors, such as cables, wires, bus bars or other types of conductors. The conductors may be electrically connected to the battery distribution unit 108. A fused electrical path is created between the high current terminals 160 and the high current fuse 140. Any type of high current fuse 140 may be utilized. Optionally, the high current fuse 140 may be disconnected from the high current terminal 160 when the disconnect plug 112 is disengaged from the receptacle header 110 for servicing battery pack 100. Optionally, the high current fuse 140 may be removable from the disconnect plug 112, such as to replace the high current fuse 140 after the high current fuse 140 has blown. In the illustrated embodiment, the high current fuse 140 is a 125 amp fuse however other rated fuses may be used in alternative embodiments.

The HVIL connector 132 includes a pair of HVIL terminals 170, which may be terminated to ends of corresponding HVIL cables 172. The HVIL cables 172 may be electrically connected to the battery distribution unit 108 (shown in FIG. 1). In the illustrated embodiment, the HVIL terminals 170 have socket terminals at mating ends thereof, however other types of mating ends may be provided in alternative embodiments. The HVIL shunt terminal 138 is configured to be mated with the HVIL terminals 170 to create the shunted electrical path. In the illustrated embodiment, the HVIL shunt terminal 138 includes posts 174 extending therefrom that are configured to be received in corresponding HVIL terminals 170. The HVIL shunt terminal 138 electrically connects the pair of HVIL terminals 170.

In an exemplary embodiment, the high current power circuit of the battery system 100 is not operational until the HVIL shunt terminal 138 is electrically connected to the HVIL terminals 170, which occurs after the high current power circuit is created (e.g. after the contacts 162 are coupled to the high current terminals 160). The high current power circuit ceases operation when the HVIL shunt terminal 138 is unplugged from the HVIL terminals 170, which occurs prior to the high current fuse 140 being unplugged from the high current terminals 160. As such, the high current power circuit is shut down prior to the high current fuse 140 breaking from the high current terminals 160, which reduces and/or eliminates arcing.

The low current terminal connectors 134 each include a pair of low current terminals 180. The serviceable fuses 136 are removably positioned between the corresponding low current terminals 180 to create fused electrical paths between the low current terminals 180. In the illustrated embodiment, the low current terminals 180 are two piece terminals, each including a blade 182 and a contact 184. The blade 182 defines a mating interface for directly engaging the serviceable fuse 136. For example, the metal end cap of the serviceable fuse 136 directly engages the mating portion of the blade 182. The contact 184 is coupled to the other end of the blade 182. In the illustrated embodiment, the contact 184 is a socket contact that receives a portion of the blade 182. The other end of the contact 184 is configured to be electrically connected to another electrical conductor, such as a low current power cable or other electrical conductor. In the illustrated embodiment, the contact 184 has a crimp barrel configured to be crimped to the corresponding low current power conductor. The low current power conductor is configured to be electrically connected to the battery distribution unit 108 (shown in FIG. 1). Other types of low current terminals 180 may be used in alternative embodiments, including a single piece terminal.

In the illustrated embodiment, the serviceable fuses 136 are arranged generally perpendicular to the high current fuse 140. The serviceable fuses 136 span laterally across the receptacle 128 (shown in FIG. 2), while the high current fuse spans longitudinally across the receptacle 128. The high current fuse 140 is a larger fuse, in size and in current rating, than the low current, serviceable fuses 136. For example, the high current fuse 140 may be a 50 A up to 200 A fuse, while the low current, serviceable fuses 136 may be in the range of up to 50 A fuses. Any type and rating fuses may be used within the battery system 100. For example, the serviceable fuses 136 may be cartridge fuses, ferrule fuses, blade type fuses, or other types of fuses. In the illustrated embodiment, the serviceable fuses 136 are ferrule type fuses having a cylindrical body with metal end caps.

Figure 4:
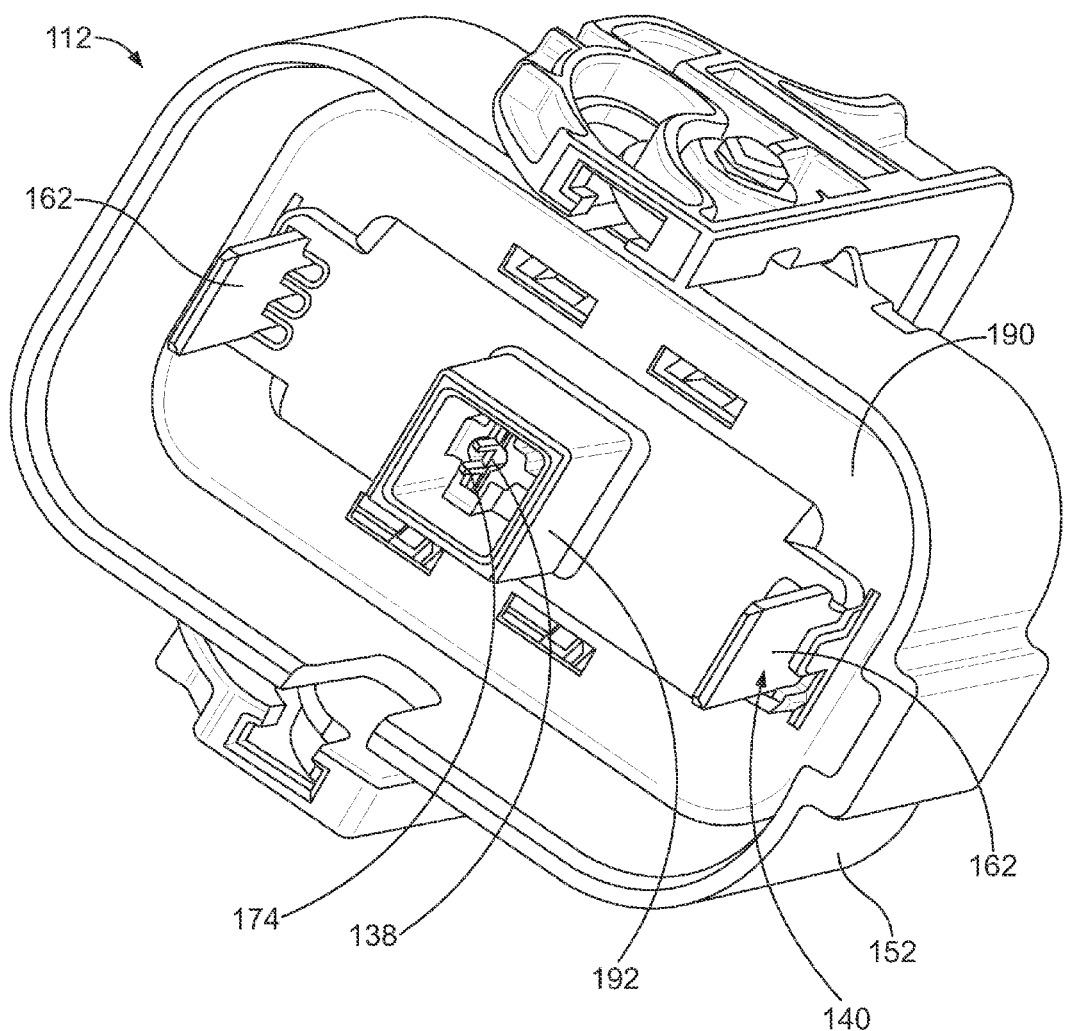
FIG. 4 is a bottom perspective view of the disconnect plug formed in accordance with an exemplary embodiment.

FIG. 4 is a bottom perspective view of the disconnect plug 112 formed in accordance with an exemplary embodiment. The disconnect plug 112 includes the cover 152 and a fixture 190 received in the cover 152. The fixture 190 is used to hold the high current fuse 140 and the HVIL shunt terminal 138. In the illustrated embodiment, the contacts 162 of the high current fuse 140 extend through the fixture 190 and are exposed below the fixture 190 for mating with the disconnect header 110 (shown in FIG. 2) when the disconnect plug 112 is coupled to the disconnect header 110.

A portion of the HVIL shunt tell final 138 is exposed below the fixture 190 for mating with the disconnect header 110 when the disconnect plug 112 is coupled to the disconnect header 110. For example, the posts 174 are exposed below the fixture 190. In an exemplary embodiment, an HVIL shroud 192 surrounds the HVIL shunt terminal 138 to protect the HVIL shunt terminal 138 from damage. In the illustrated embodiment, the HVIL shroud 192 is boxed shaped, however the HVIL shroud 192 may have other shapes and alternative embodiments.

Figure 5:
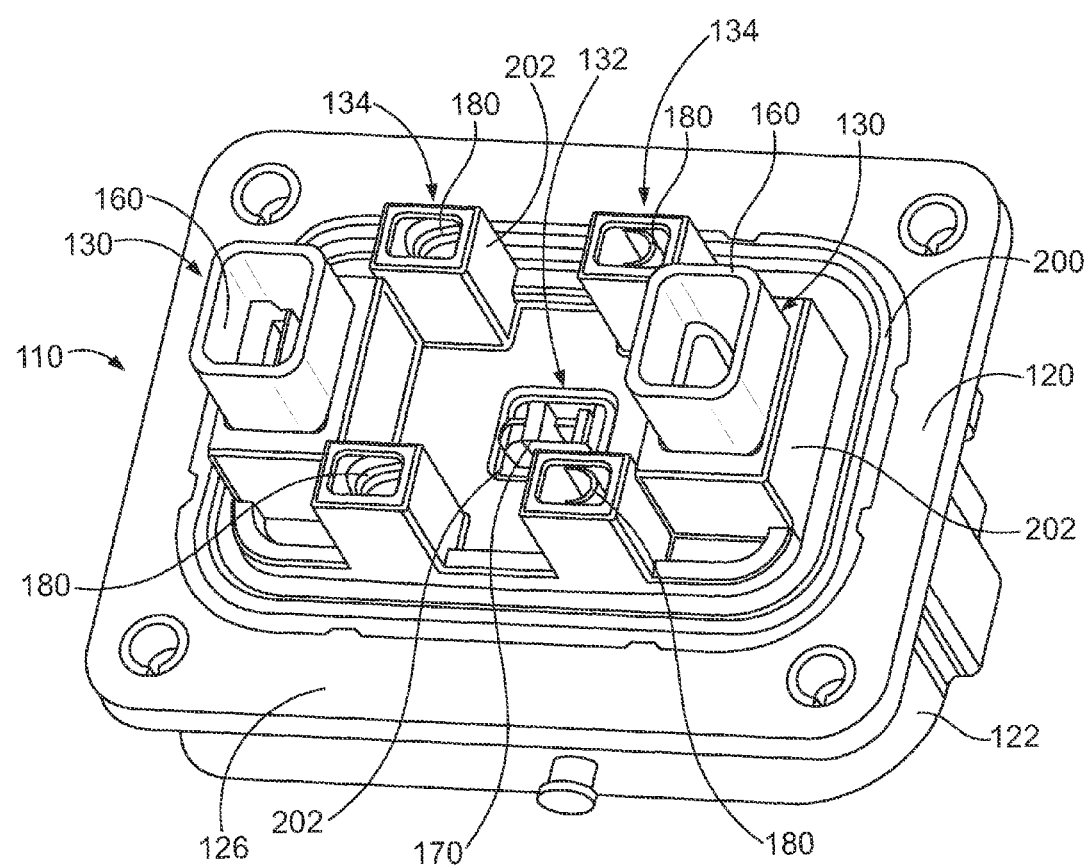
FIG. 5 is a bottom perspective view of the disconnect header formed in accordance with an exemplary embodiment.

FIG. 5 is a bottom perspective view of the disconnect header 110 formed in accordance with an exemplary embodiment. The bottom 126 of the base 120 is illustrated in FIG. 5. In an exemplary embodiment, a gasket 200 surrounds a connector area of the disconnect header 110 at the bottom 126. The gasket 200 is used to seal the disconnect header 110 to the outer casing 104 or other structure to which the disconnect header 110 is coupled. Alternatively, the gasket 200 may not be needed, such as for an interior MSD location.

Portions of the high current terminal connector 130 HVIL connector 132 and low current terminal connectors 134 extend below the bottom 126 of the base 120. For example, each of the connectors may include connector bodies 202 that are used to hold the corresponding electrical conductors. The connector bodies 202 may be integral with the base 120 and/or housing 122. For example, the connector bodies 202 may be co-molded with the base 120 and the housing 122. Alternatively, the connector bodies 202 may be separate and discrete from the base 120 and the housing 122 and coupled to the base 120 and/or housing 122 to hold the corresponding conductors in position for mating with the disconnect plug 112 (shown in FIG. 4).

Optionally, the HVIL terminals 170, high current terminals 160, and low current terminals 180 may be loaded into the corresponding connector bodies 202 from below. The wires or cables or other conductors connected to such terminals 160, 170, 180 may extend therefrom below the base 120 and may be routed to the battery distribution unit 108.

Figure 6:
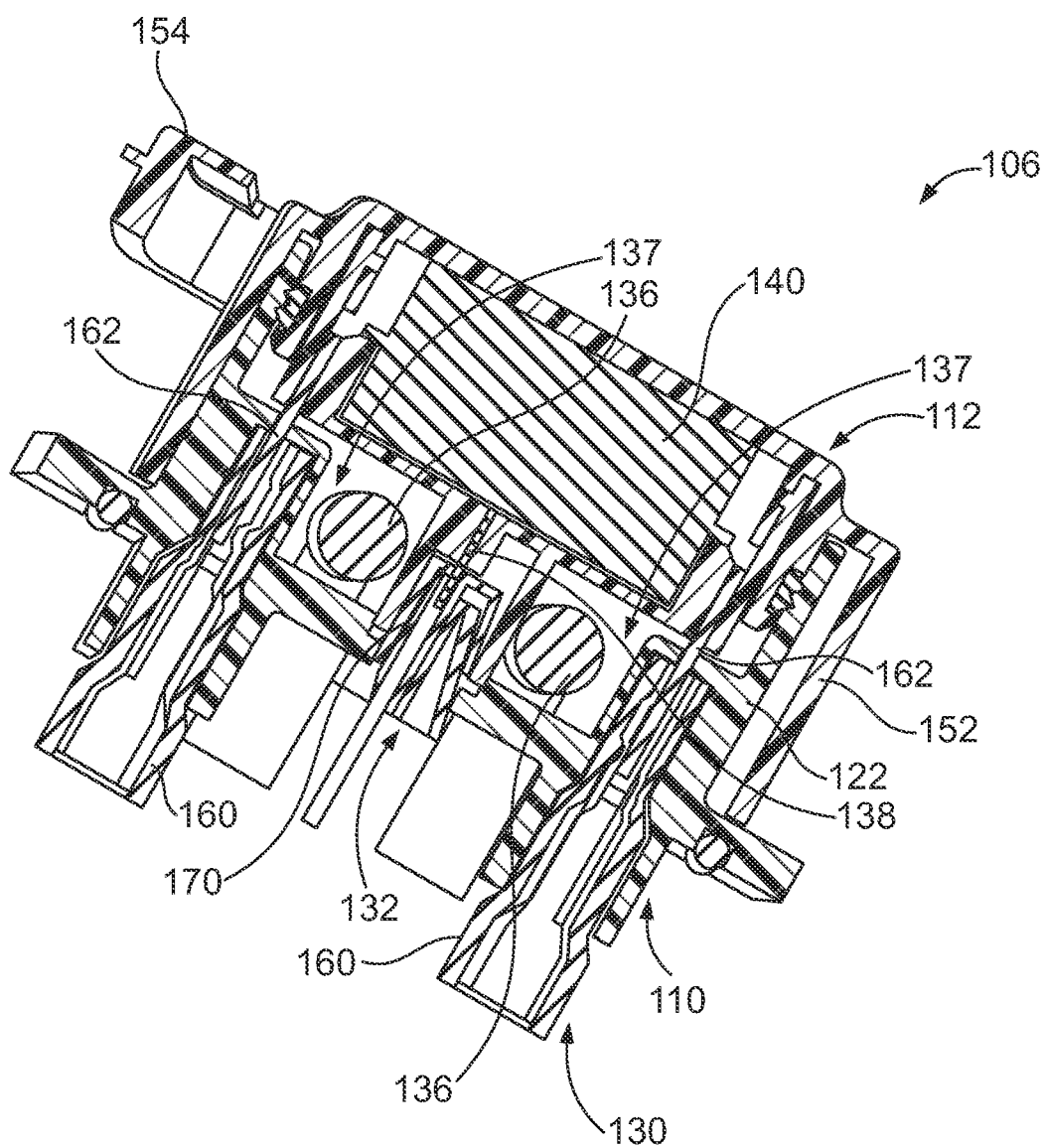
FIG. 6 is a cross sectional view of the MSD showing the disconnect plug fully mated and locked position with the disconnect header.
Figure 7:
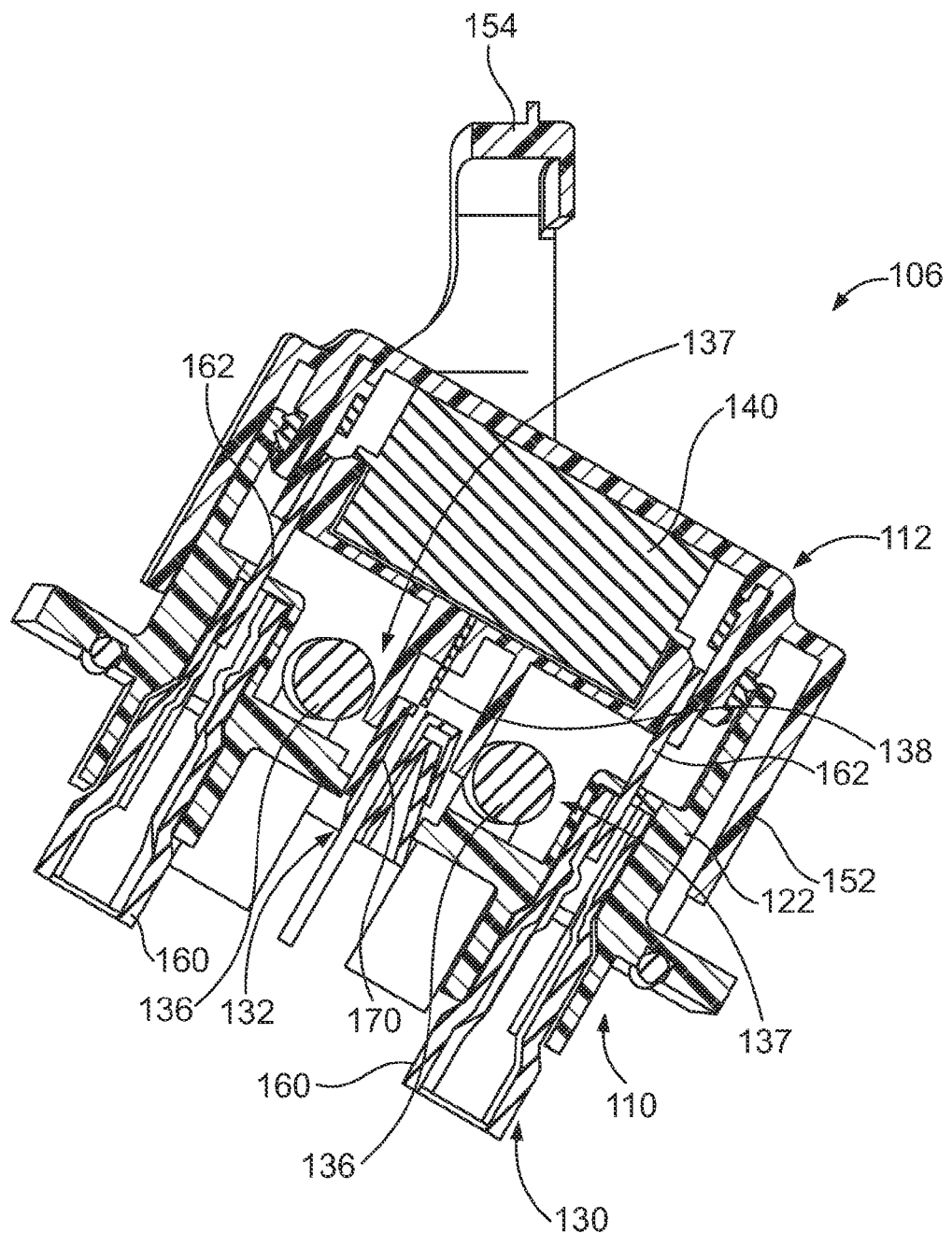
FIG. 7 is a cross sectional view of the MSD showing the disconnect plug in a partially mated position/partially unmated position.
Figure 8:
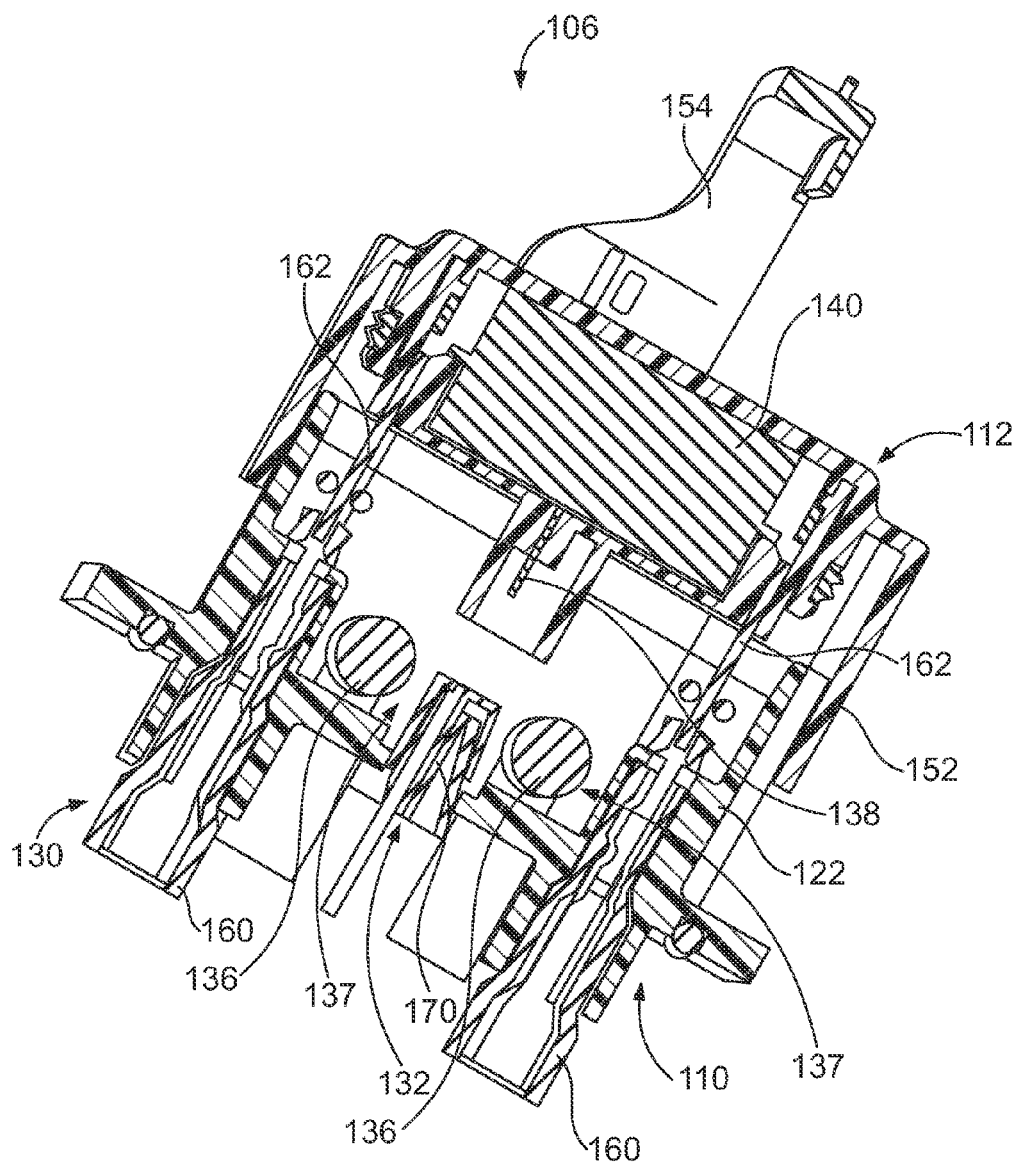
FIG. 8 is a cross sectional view of the MSD showing the disconnect plug in an initial mating position/unmated position.

FIG. 6 is a cross sectional view of the MSD 106 showing the disconnect plug 112 fully mated and locked position with the disconnect header 110, where the HVIL connector 132 and high current terminal connector 130 are fully engaged. FIG. 7 is a cross sectional view of the MSD 106 showing the disconnect plug 112 in a partially mated position/partially unmated position, where the HVIL connector 132 is fully disengaged while the high current terminal connector 130 is still engaged. FIG. 8 is a cross sectional view of the MSD 106 showing the disconnect plug 112 in an initial mating position/unmated position, where the HVIL connector 132 and high current terminal connector are fully disengaged. The serviceable fuses 136 are contained within the disconnect header 110. The serviceable fuses 136 are positioned in the space 137, which is otherwise wasted space and unused by other components. The serviceable fuses 136 are positioned in the spaces 137 between the HVIL connector 132 and the high current terminal connector 130.

In an exemplary embodiment, the lever 154 is used to mate the disconnect plug 112 to the disconnect header 110 or unmate the disconnect plug 112 from the disconnect header 110. For example, actuation of the lever 154 in an opening direction moves the disconnect plug 112 relative to the disconnect header 110 by pulling the disconnect plug 112 into the disconnect header 110, such as from the position shown in FIG. 8, through the position shown in FIG. 7, to the position shown in FIG. 6. Actuation of the lever 154 in a closing direction moves the disconnect plug 112 relative to the disconnect header 110 by pushing the disconnect plug 112 away from the disconnect header 110, such as from the position shown in FIG. 6, through the position shown in FIG. 7, to the position shown in FIG. 8.

In the initial mating position (FIG. 8), the cover 152 engages the housing 122. The high current terminals 160 are fully disengaged from the contacts 162 and the HVIL shunt terminal 138 is fully disengaged from the HVIL terminals 170. During mating, the disconnect plug 112 is plugged into the disconnect header 110 to the partially mated position (FIG. 7) and the high current terminals 160 initially engage the contacts 162, creating a fused electrical path through the high current fuse 140. In the partially mated position, the HVIL shunt terminal 138 is still fully disengaged from the HVIL terminals 170. In the partially mated position, because the HVIL circuit is open, the battery system 100 (shown in FIG. 1) does not allow operation of the high current circuit. As the disconnect plug 112 continues to plug into the disconnect header 110, such as to the fully mated position (FIG. 6), the HVIL shunt terminal 138 mates with the HVIL terminals 170. Once the HVIL circuit is closed or made, the battery system 100 allows operation of the high current circuit.

Unmating or disconnecting of the disconnect plug 112 from the disconnect header 110 is performed in the reverse sequence. The HVIL shunt terminal 138 is initially unmated from the HVIL terminals 170, causing the battery system to cease operation of the high current circuit. Further unmating of the disconnect plug 112 causes the contacts 162 to unmate from the high current terminals 160, but only after the high current circuit is off, thus eliminating arcing. Once the disconnect plug 112 is fully removed from the disconnect header 110, the serviceable fuses 136 may be accessed for servicing or removing. The high current fuse 140 may also be serviced once the disconnect plug 112 is fully removed from the disconnect header 110.

Figure 9:
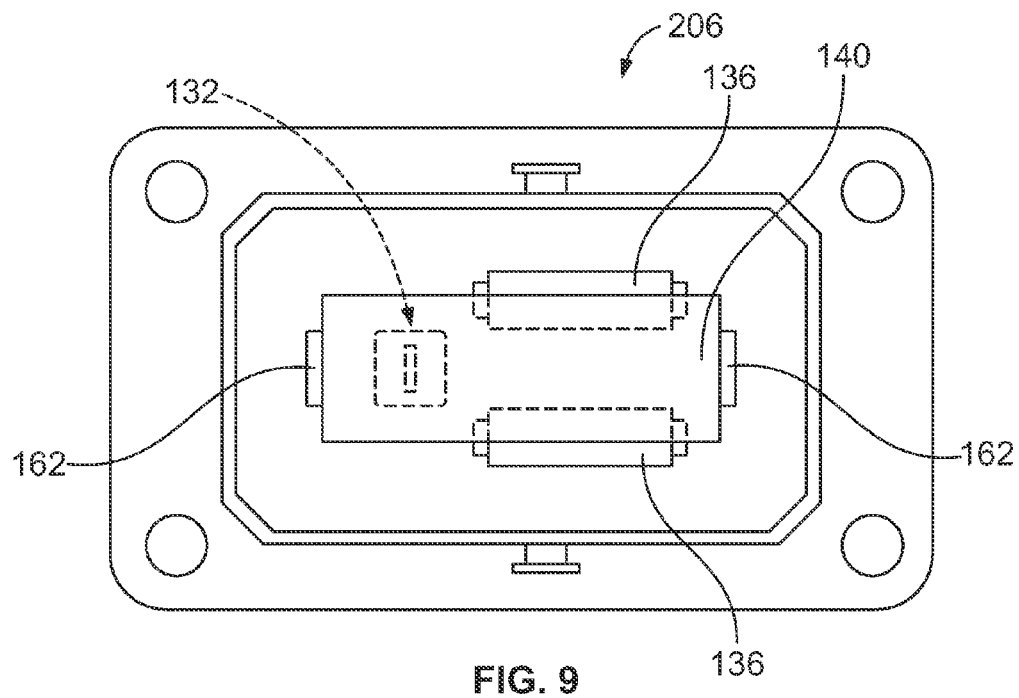
FIG. 9 illustrates a manual service disconnect formed in accordance with an exemplary embodiment.

FIG. 9 illustrates a manual service disconnect 206 formed in accordance with an exemplary embodiment. The manual service disconnect is similar to the manual service disconnect 106 (shown in FIG. 1), however the manual service disconnect 206 has a different configuration of the serviceable fuses 136 and a different location of the HVIL connector 132. The serviceable fuses 136 are still positioned below the high current fuse 140, however the serviceable fuses 136 are arranged side-by-side, generally parallel to the high current fuse 140. The serviceable fuses 136 and the high current fuse 140 spans longitudinally. Both serviceable fuses 136 are positioned between the HVIL connector 132 and one of the contacts 162 of the high current fuse 140. Other configurations are possible in alternative embodiments.

Figure 10:
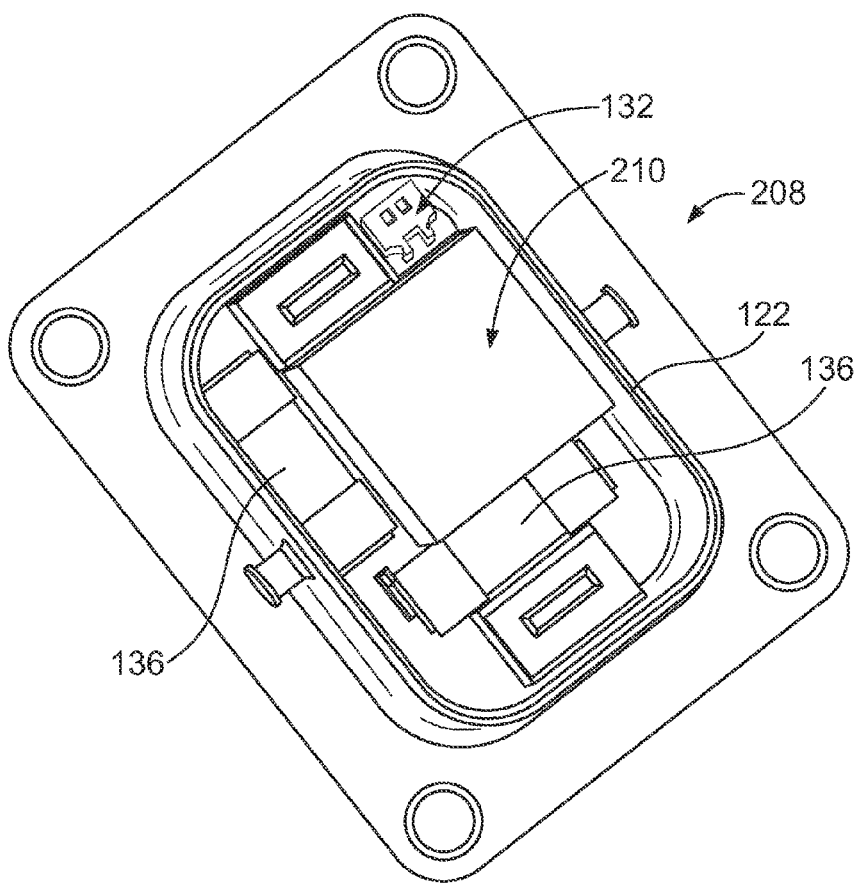
FIG. 10 illustrates a manual service disconnect formed in accordance with an exemplary embodiment.

FIG. 10 illustrates a manual service disconnect 208 formed in accordance with an exemplary embodiment. The manual service disconnect 208 is similar to the manual service disconnect 106 (shown in FIG. 1), however the manual service disconnect 206 has a different location of the HVIL connector 132 and a different configuration of current power control devices 136. For example, the current power control devices 136 include both the serviceable fuses 136 as well as a relay 210. The relay 210 is arranged within the housing 122. The relay 210 is serviceable once the disconnect plug 112 (shown in FIG. 2) is disconnected from the disconnect header 110. The relay 210 has two high current blades and two coil control blades (not shown). The blades are engaged with corresponding control device terminal connectors, such as relay blade connectors, to create their electrical circuits, respectively, and are configured in similar fashion to serviceable fuses.

Embodiments described herein utilize serviceable fuses or additional relays in the waste space under the high current fuse. Such an arrangement makes the low current fuses or/and relay serviceable without adding an additional cutting hole in the battery pack casing 104. The casing 104 shielding capability is not reduced and cost is minimized.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A manual service disconnect for opening and closing a high current fused electrical path of a battery distribution unit used to switch and control operation of components of a battery system, the manual service disconnect comprising:
   a disconnect header discrete from and configured to be mounted proximate to a battery distribution unit of a battery pack of the battery system, the disconnect header comprising a housing defining a receptacle isolated from an interior of the battery distribution unit, a high current terminal connector within the receptacle, a high voltage interlock (HVIL) connector within the receptacle and a low current control device terminal connector within the receptacle, the low current control device terminal connector operating at a lower current than the high current terminal connector, the high current terminal connector, the HVIL connector and the low current control device terminal connector are electrically connected to the battery distribution unit;
   a disconnect plug removably coupled to the disconnect header by a lever rotatable between closed and open positions for a manual connection and disconnection process for servicing the battery system, the disconnect plug having a high current fuse electrically connected to the high current terminal connector and a HVIL shunt terminal electrically connected to the HVIL connector, respectively, the disconnect plug being removed to disconnect the high current fuse and the HVIL shunt terminal from the high current terminal connector and the HVIL connector, respectively; and
   a low current power control device received in the receptacle, the low current power control device being electrically connected to the low current control device terminal connector, the low current power control device being exposed within the receptacle of the disconnect header of the manual service disconnect for servicing when the disconnect plug of the manual service disconnect is removed from the disconnect header without directly accessing the battery distribution unit, the low current power control device being inaccessible when the disconnect plug is coupled to the disconnect header.

2. The manual service disconnect of claim 1, wherein a space is defined in the receptacle between the HVIL connector and the high current terminal connector, the low current power control device being positioned in the space.

3. The manual service disconnect of claim 1, wherein the housing includes an open top, the disconnect plug being plugged into the housing to close the open top, the low current power control device being covered by the disconnect plug.

4. The manual service disconnect of claim 1, wherein the disconnect header includes a base configured to be mounted directly to the battery pack, and wherein the high current terminal connector, the high voltage interlock connector and the low current control device terminal connector extend into the battery pack through the base.

5. The manual service disconnect of claim 1, wherein the disconnect header includes a base having a top and a bottom, the housing extending from the top, the bottom being configured to be mounted directly to the battery pack, and wherein the high current terminal connector, the HVIL connector and the low current control device terminal connector extend from the base below the bottom.

6. The manual service disconnect of claim 1, wherein the low current power control device is configured to be disconnected from the low current control device terminal connector and removed from the disconnect header when the disconnect plug is removed from the disconnect header and after the HVIL shunt terminal and high current fuse are disconnected from the HVIL connector and the high current terminal connector, respectively.

7. The manual service disconnect of claim 1, wherein the high current terminal connector includes a pair of high current terminals, the high current fuse includes a pair of contacts electrically connected to the high current terminals when the disconnect plug is coupled to the disconnect header, the high current fuse defining a fused electrical path between the contacts.

8. The manual service disconnect of claim 1, wherein the HVIL connector includes a pair of HVIL terminals, the HVIL shunt terminal creating a shunt electrical path between the HVIL terminals when the disconnect plug is coupled to the disconnect header.

9. The manual service disconnect of claim 1, wherein the low current control device terminal connector includes a pair of low current terminals, the low current power control device comprising a serviceable fuse, the serviceable fuse electrically connecting the low current terminals when the disconnect plug is coupled to the disconnect header, the serviceable fuse defining a fused electrical path between the low current terminals.

10. The manual service disconnect of claim 1, further comprising a second low current control device terminal connector and a second low current power control device in the disconnect header, the HVIL connector being positioned between the low current power control device and the second low current power control device.

11. The manual service disconnect of claim 10, wherein the disconnect plug includes a HVIL shroud surrounding the HVIL shunt terminal, the HVIL shroud being positioned between the low current power control device and the second low current power control device when the disconnect plug is coupled to the disconnect header.

12. The manual service disconnect of claim 1, wherein the low current power control device comprises a relay received in the receptacle, the relay being exposed when the disconnect plug is removed from the disconnect header, the relay being inaccessible when the disconnect plug is coupled to the disconnect header.

13. A manual service disconnect for opening and closing a high current fused electrical path of a battery distribution unit used to switch and control operation of components of a battery system, the manual service disconnect comprising:
　a disconnect header discrete from and configured to be mounted proximate to a battery distribution unit of a battery pack of the battery system, the disconnect header comprising a housing defining a receptacle isolated from an interior of the battery distribution unit, a high current terminal connector within the receptacle, a high voltage interlock (HVIL) connector within the receptacle and a low current control device terminal connector within the receptacle, the low current control device terminal connector operating at a lower current than the high current terminal connector, the high current terminal connector, the HVIL connector and the low current control device terminal connector are electrically connected to the battery distribution unit;
　a disconnect plug removably coupled to the disconnect header by a lever rotatable between closed and open positions for a manual connection and disconnection process for servicing the battery system, the disconnect plug having a high current fuse electrically connected to the high current terminal connector when the disconnect plug is coupled to the disconnect header and unmated from the high current terminal connector when the disconnect plug is removed from the disconnect header, the high current fuse forming part of a high current circuit controlling power to the battery pack, the disconnect plug having a HVIL shunt terminal electrically connected to the HVIL connector when the disconnect plug is coupled to the disconnect header and unmated from the HVIL connector when the disconnect plug is removed from the disconnect header, the HVIL shunt terminal controlling power supply on the high current circuit; and
　a low current power control device received in the receptacle, the low current power control device being electrically connected to the low current control device terminal connector, the low current power control device being exposed within the receptacle of the disconnect header of the manual service disconnect for servicing when the disconnect plug of the manual service disconnect is removed from the disconnect header without directly accessing the battery distribution unit, the low current power control device being inaccessible when the disconnect plug is coupled to the disconnect header.

14. The manual service disconnect of claim 13, wherein a space is defined in the receptacle between the HVIL connector and the high current terminal connector, the low current power control device being positioned in the space.

15. The manual service disconnect of claim 13, wherein the housing includes an open top, the disconnect plug being plugged into the housing to close the open top, the low current power control device being covered by the disconnect plug.

16. The manual service disconnect of claim 13, wherein the disconnect header includes a base having a top and a bottom, the housing extending from the top, the bottom being configured to be mounted directly to the battery pack, and wherein the high current terminal connector, the HVIL connector and the low current control device terminal connector extend from the base below the bottom.

17. The manual service disconnect of claim 13, wherein the low current power control device is configured to be disconnected from the low current control device terminal connector and removed from the disconnect header when the disconnect plug is removed from the disconnect header and after the HVIL shunt terminal and high current fuse are disconnected from the HVIL connector and the high current terminal connector, respectively.

18. A battery system comprising:
　a battery pack having a plurality of battery cells in an outer casing;
　a battery distribution unit controlling power distribution to the battery cells, the battery distribution unit being used to switch and control operation of components of the battery system; and
　a manual service disconnect for opening and closing a high current fused electrical path of the battery distribution unit, the manual service disconnect comprising:
　a disconnect header coupled to the outer casing of the battery pack proximate to the battery distribution unit of the battery system, the disconnect header being discrete from the battery distribution unit, the disconnect header comprising a housing defining a receptacle isolated from an interior of the battery distribution unit, a high current terminal connector within the receptacle, a high voltage interlock (HVIL) connector within the receptacle and a low current control device terminal connector within the receptacle, the high current terminal connector, HVIL connector and low current control device terminal connector being electrically connected to the battery distribution unit, the low current control device terminal connector operating at a lower current than the high current terminal connector, the high current terminal connector, the HVIL connector and the low current control device terminal connector are electrically connected to the battery distribution unit;

a disconnect plug removably coupled to the disconnect header by a lever rotatable between closed and open positions for a manual connection and disconnection process for servicing the battery system, the disconnect plug having a high current fuse electrically connected to the high current terminal connector and a HVIL shunt terminal electrically connected to the HVIL connector, the disconnect plug being removed to disconnect the high current fuse and the HVIL shunt terminal from the high current terminal connector and the HVIL connector, respectively; and a low current power control device received in the receptacle, the low current power control device being electrically connected to the low current control device terminal connector, the low current power control device being exposed within the receptacle of the disconnect header of the manual service disconnect for servicing when the disconnect plug of the manual service disconnect is removed from the disconnect header without directly accessing the battery distribution unit, the low current power control device being inaccessible when the disconnect plug is coupled to the disconnect header.

19. The battery system of claim 18, wherein a space is defined in the receptacle between the HVIL connector and the high current terminal connector, the low current power control device being positioned in the space.

20. The battery system of claim 18, wherein the disconnect header includes a base having a top and a bottom, the housing extending from the top, the bottom being mounted directly to the battery pack, and wherein the high current terminal connector, the HVIL connector and the low current control device terminal connector extend from the base below the bottom into the outer casing of the battery pack.

* * * * *